(12) United States Patent
Ahn

(10) Patent No.: US 12,506,410 B2
(45) Date of Patent: Dec. 23, 2025

(54) BUCK-BOOST DC/DC CONVERTER

(71) Applicant: LX Semicon Co., Ltd., Daejeon (KR)

(72) Inventor: Young Kook Ahn, Daejeon (KR)

(73) Assignee: LX Semicon Co., Ltd., Daejeon (KR)

( * ) Notice: Subject to any disclaimer, the term of this patent is extended or adjusted under 35 U.S.C. 154(b) by 476 days.

(21) Appl. No.: 18/084,413

(22) Filed: Dec. 19, 2022

(65) Prior Publication Data

US 2023/0198407 A1 Jun. 22, 2023

(30) Foreign Application Priority Data

Dec. 20, 2021 (KR) .................. 10-2021-0182927

(51) Int. Cl.
*H02M 3/158* (2006.01)
*H02M 1/00* (2006.01)
*H02M 1/08* (2006.01)

(52) U.S. Cl.
CPC ....... *H02M 3/1582* (2013.01); *H02M 1/0009* (2021.05); *H02M 1/08* (2013.01); *H02M 3/1588* (2013.01)

(58) Field of Classification Search
CPC ............. H02M 1/0003; H02M 1/0009; H02M 1/0022; H02M 1/0025; H02M 1/0054; H02M 1/0058; H02M 1/08; H02M 3/156; H02M 3/157; H02M 3/158; H02M 3/1582; H02M 3/1584; H02M 3/1588; G01R 19/2509; Y02B 70/10
See application file for complete search history.

(56) References Cited

U.S. PATENT DOCUMENTS

| | | | | |
|---|---|---|---|---|
| 2012/0274295 A1* | 11/2012 | Lin | ...... | H02M 3/1582 323/282 |
| 2014/0084883 A1* | 3/2014 | Tanabe | ...... | H02M 3/1582 323/271 |
| 2019/0204366 A1* | 7/2019 | Zhou | ...... | G01R 19/2509 |
| 2020/0091822 A1* | 3/2020 | Ou | ...... | H02M 3/156 |
| 2021/0191892 A1* | 6/2021 | Yu | ...... | H02J 3/0073 |
| 2022/0069715 A1* | 3/2022 | Karri | ...... | H02M 3/1582 |

FOREIGN PATENT DOCUMENTS

| | | | |
|---|---|---|---|
| JP | 6195273 B2 | 9/2017 | |
| JP | 6564366 B2 | 8/2019 | |
| KR | 101692169 B1 | 1/2017 | |

* cited by examiner

*Primary Examiner* — Thienvu V Tran
*Assistant Examiner* — Shahzeb K Ahmad
(74) *Attorney, Agent, or Firm* — Polsinelli PC

(57) ABSTRACT

The present disclosure provides sensing a peak current and estimating a turn-off time of a switch using the peak to perform a discontinuous current mode (DCM) operation. According to the present disclosure, the buck-boost DC/DC converter includes: a first control circuit configured to build up a current, input through an input node, in an inductor during a first time period of a switching period; a sensing circuit configured to sense a current input through the input node to generate a sampling value for estimating a duration of a second time period; and a second control circuit configured to receive the sampling value from the sensing circuit and to output the current built up in the inductor through an output side during the second time period estimated based on the sampling value.

17 Claims, 23 Drawing Sheets

BUCK-BOOST DC/DC CONVERTER

CROSS REFERENCE TO RELATED APPLICATION

This application claims priority to Republic of Korea Patent Application No. 10-2021-0182927 filed on Dec. 20, 2021, which is hereby incorporated by reference in its entirety.

BACKGROUND

1. Field of Technology

The present disclosure relates to a buck-boost DC/DC converter that converts power.

2. Related Technology

Among converters for converting power, a buck-boost DC/DC converter is a converter that lowers or raises an output voltage than an input voltage and outputs the output voltage. The buck-boost DC/DC converter can be used in a buck mode or a boost mode appropriately selected according to the ratio of an input voltage to an output voltage in an application.

The operation of the buck-boost DC/DC converter can be divided into a discontinuous current mode (DCM) mode in which an inductor current reaches zero in a switching period and a continuous current mode (CCM) mode in which the inductor current is continuous instead of reaching zero.

The buck-boost DC/DC converter is classified into a synchronous converter and an asynchronous converter. The synchronous converter requires a zero-current detection circuit for detecting a time when the inductor current reaches zero when operating in the DCM mode.

The discussions in this section are only to provide background information and do not constitute an admission of prior art.

SUMMARY

In view of such circumstances, an object of the present disclosure is to provide a buck-boost DC/DC converter capable of operating in a DCM mode without using a zero current detection circuit.

In order to achieve the above-described object, in one aspect, the present disclosure provides a buck-boost DC/DC converter including a first switch having one side connected to an input node through which an input voltage is provided, a second switch disposed between the other side of the first switch and an output node through which an output voltage is provided, an inductor having one side connected to a first node between the first switch and the second switch and the other side connected to a second node at which a ground voltage is formed, an output capacitor having one side connected to the output node and the other side connected to the second node, a sensing circuit configured to sense a current flowing from the input node to generate a sampling value for estimating a duration of a second time period of a switching period, a first control circuit configured to turn on the first switch during a first time period of the switching period, and a second control circuit configured to receive the sampling value from the sensing circuit and to turn on the second switch during the second time period estimated based on the sampling value.

In another aspect, the present disclosure provides a buck-boost DC/DC converter including a first control circuit configured to build up a current input through an input node in an inductor during a first time period of a switching period, a sensing circuit configured to sense the current input through the input node to generate a sampling value for estimating a duration of a second time period, and a second control circuit configured to receive the sampling value from the sensing circuit and to output the current built up in the inductor during the second time period of the switching period estimated based on the sampling value.

The sampling value may correspond to a peak value of the input current in the switching period.

The duration of the second time period may be proportional to the sampling value.

The duration of the second time period may be proportional to the sampling value and inversely proportional to the absolute value of the output voltage.

DETAILED DESCRIPTION OF EMBODIMENTS

Hereinafter, embodiments will be described in detail with reference to the drawings.

Figure 1:
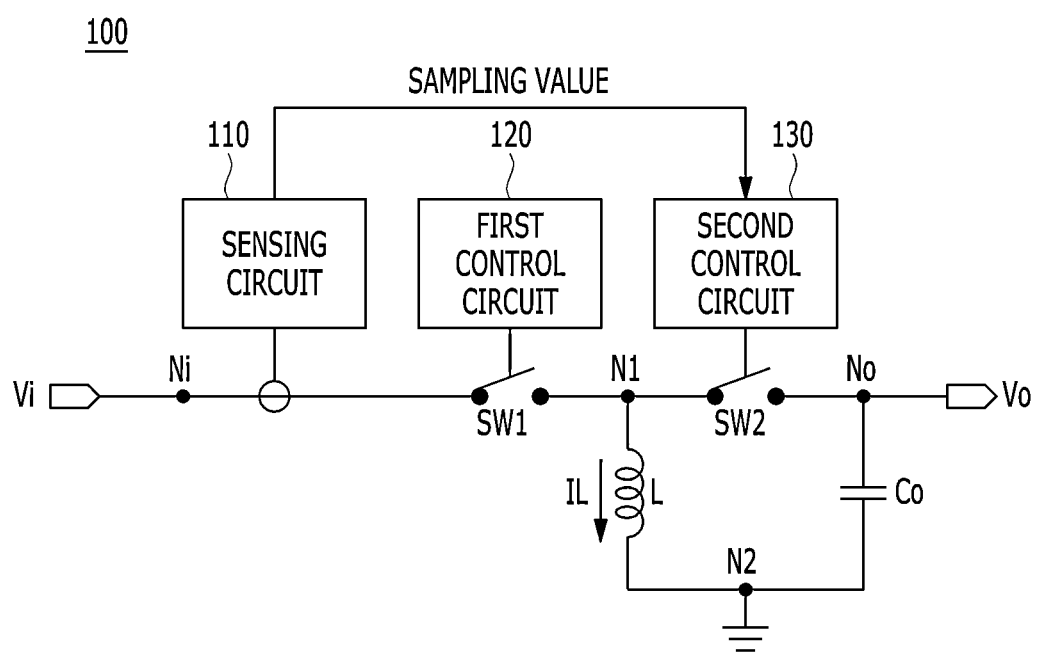
FIG. 1 is a configuration diagram of a buck-boost DC/DC converter according to an embodiment.

FIG. 1 is a configuration diagram of a buck-boost DC/DC converter according to an embodiment.

Referring to FIG. 1, the buck-boost DC/DC converter 100 according to the present embodiment may include a first switch SW1 having one side connected to an input node Ni through which an input voltage Vi is supplied, a second switch SW2 disposed between the other side of the first switch SW1 and an output node No through which an output voltage Vo is supplied, an inductor L having one side connected to a first node N1 between the first switch SW1 and the second switch SW2 and the other side connected to a second node N2 at which a ground voltage is formed, an output capacitor Co having one end connected to the output node No and the other end connected to the second node N2, a sensing circuit 110 that senses a current flowing from the input node Ni and generates a sampling value SAMPLING VALUE for estimating the duration of a second time period of a switching period, a first control circuit 120 that turns on the first switch SW1 during a first time period of the switching period, and a second control circuit 130 that receives the sampling value SAMPLING VALUE from the sensing circuit 110 and turns on the second switch SW2 during the second time period estimated based on the sampling value SAMPLING VALUE.

The first switch SW1 is connected between the input node Ni and the inductor L and supplies a current from the input node Ni to the inductor L when turned on. The first switch SW1 cuts off the current flowing from the input node Ni to the inductor L when turned off.

The second switch SW2 is connected between the inductor L and the output node No and transfers energy generated by the current flowing through the inductor L to the output node No when turned on. The second switch SW2 cuts off the current flowing from the inductor L to the output node No when turned off.

In the inductor L, the current flowing from the input node Ni when the first switch SW1 is turned on in the buck-boost DC/DC converter 100 is built up. The inductor L may provide the built-up current to the output node No when the second switch SW2 is turned on.

The output capacitor Co is charged when the built-up current of the inductor L is transferred to the output terminal and is discharged to the output node No when the second switch SW2 is turned off.

The sensing circuit 110 may sense a current supplied from the input node Ni. The sensing circuit 110 may generate a sampling value SAMPLING VALUE corresponding to the sensed current and used to estimate the duration of the second time period.

The first control circuit 120 may be connected to the first switch SW1 to control the operation of the first switch SW1. The first control circuit 120 may turn on the first switch SW1 for the first time period to build up the current of the inductor L and turn off the first switch SW at the end of the first time period to cut off the input current flowing through the inductor L.

The second control circuit 130 may be connected to the second switch SW2 to control the operation of the second switch SW2. In this case, the second control circuit 130 may receive the sampling value SAMPLING VALUE, which is the output value of the sensing circuit 110, and estimate a time at which the second time period will end based on the sampling value SAMPLING VALUE. The second control circuit 130 may turn on the second switch SW2 at the start of the second time period that starts after the end of the first time period, and turn off the second switch SW2 when the second time period ends based on the duration of the second time period estimated based on the sampling value SAMPLING VALUE.

Figure 2:
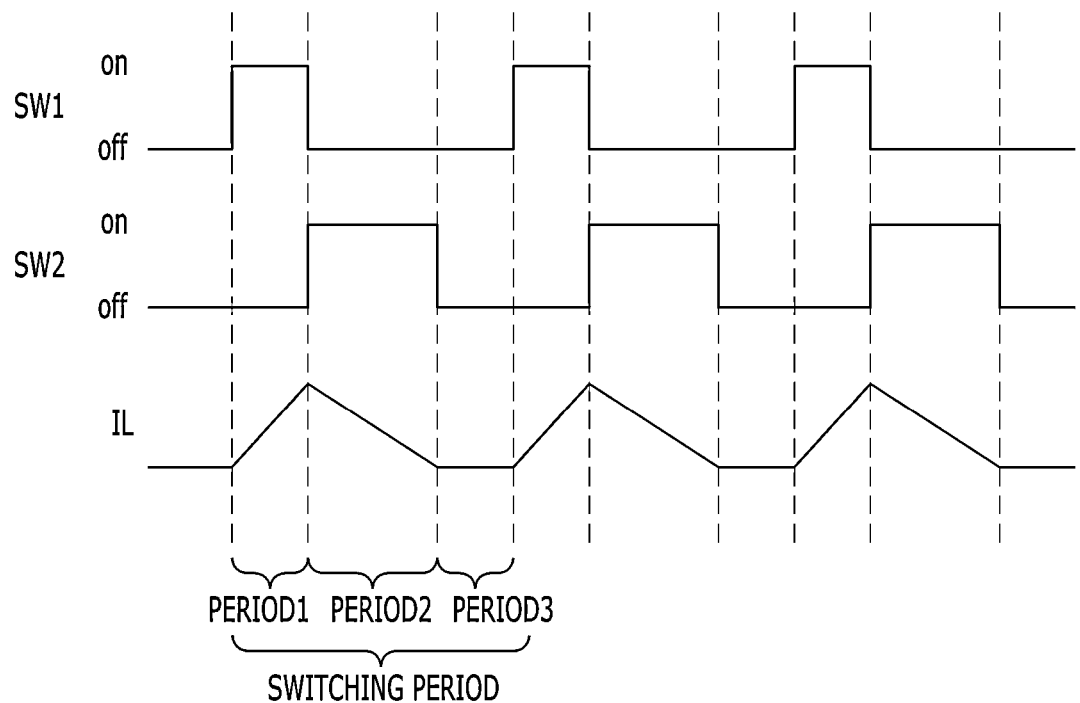
FIG. 2 is a diagram showing on-off timings of a first switch and a second switch and an inductor current in FIG. 1.

FIG. 2 is a state diagram showing on-off timings of the first switch and the second switch and an inductor current in FIG. 1.

Referring to FIG. 1 and FIG. 2, in one switching period, a first time period PERIOD1 starts at the start of the switching period, a second time period PERIOD2 starts after the first time period PERIOD1 ends, a third time period PERIOD3 starts after the second time period PERIOD2 ends, and the next switching period after the third time period PERIOD3.

The first switch SW1 is turned on in a turn-off state when the first time period PERIOD1 starts and is turned off when the first time period PERIOD1 ends.

During the first time period PERIOD1, the first switch SW1 is turned on and thus a current flows from the input node Ni to the inductor L. The inductor current IL flowing through the inductor L increases and builds up during the first time period PERIOD1.

The second switch SW2 is turned on in a turn-off state when the second time period PERIOD2 starts and is turned off when the second time period PERIOD2 ends. The second switch SW2 is turned on to provide the built-up inductor current IL to the output node. This causes the inductor current IL to decrease.

In this case, the second switch SW2 may be turned off at a time estimated by the second control circuit 130 as the end of the second time period PERIOD2 with reference to the sampling value SAMPLING VALUE.

Thereafter, in the third time period PERIOD3, the first switch SW1 and the second switch SW2 are turned off and thus the inductor current IL can be substantially zero during the third time period PERIOD3.

Figure 3:
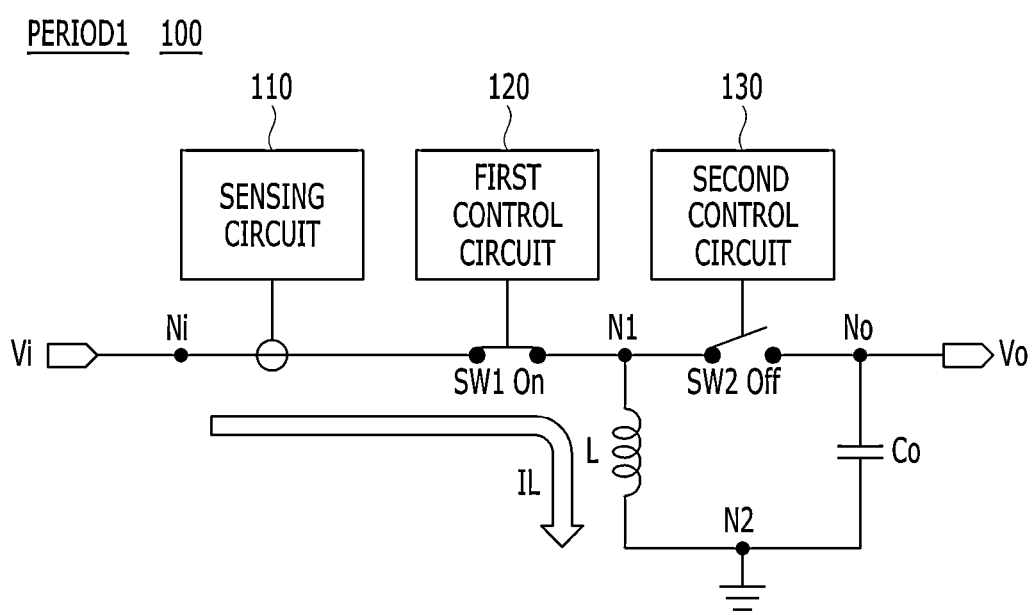
FIG. 3 is a diagram showing an inductor current in a first time period in the buck-boost DC/DC converter of FIG. 1.
Figure 4:
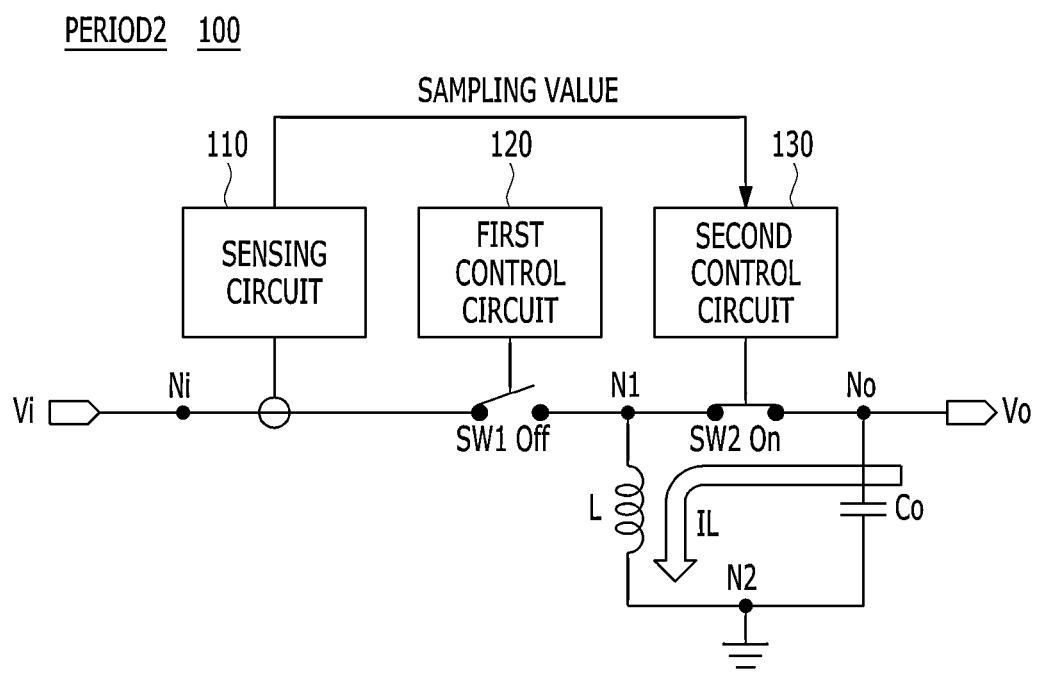
FIG. 4 is a diagram showing an inductor current in a second time period in the buck-boost DC/DC converter of FIG. 1.
Figure 5:
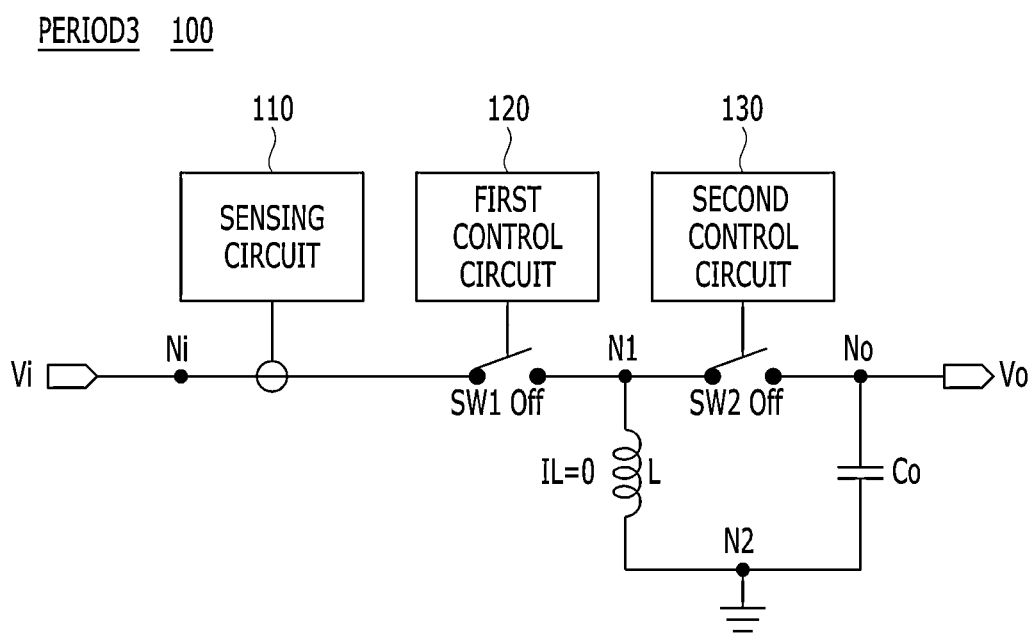
FIG. 5 is a diagram showing an inductor current in a third time period in the buck-boost DC/DC converter of FIG. 1.

FIG. 3 is a diagram showing an inductor current in the first time period in the buck-boost DC/DC converter of FIG. 1. FIG. 4 is a diagram showing an inductor current in the second time period in the buck-boost DC/DC converter of FIG. 1. FIG. 5 is a diagram showing an inductor current in the third time period in the buck-boost DC/DC converter of FIG. 1.

Referring to FIGS. 3 to 5, the inductor current IL, which is a current flowing through the inductor L in the first time period PERIOD1, the second time period PERIOD2, and the third time period PERIOD3 of one switching period, can be checked.

As shown in FIG. 3, during the first time period PERIOD1, the first switch SW1 is turned on and thus the inductor current IL flows through a path connecting the input node Ni, the first switch SW1, the first node N1, the inductor L, and the second node N2. Due to the reactance of the inductor L, the inductor current IL gradually increases over time in the first time period PERIOD1. At this time, the energy to be transferred to the output node No is charged in the inductor L.

As shown in FIG. 4, in the second time period PERIOD2, the first switch SW1 is turned off, and the second switch SW2 is turned on. At this time, due to the inductor current IL built up in the inductor L, the inductor current IL flows through a path connecting the output node No, the second switch SW2, the inductor L, and the second node N2, and thus the energy of the current built up in the inductor L is transferred to the output node No. In this case, an output voltage Vo inverted compared to the input voltage Vi may be output to the output node No in the direction of the inductor current IL.

As shown in FIG. 5, both the first switch SW1 and the second switch SW2 are turned off during the third time period PERIOD3. As both the first switch SW1 and the second switch SW2 are turned off during the third time period PERIOD3, the inductor current IL becomes 0.

As shown in FIG. 5, since no current flows through the inductor L, a reverse current flowing from the output capacitor Co to the inductor L is blocked, and thus the efficiency of the buck-boost DC/DC converter 100 can be improved.

Accordingly, the buck-boost DC/DC converter 100 according to an embodiment can operate in the DCM mode in which the current IL of the inductor L reaches 0 in the switching period because the inductor current becomes substantially 0 during the third time period PERIOD3.

Hereinafter, detailed configurations and operations of the sensing circuit 110, the first control circuit 120, and the second control circuit 130 of the buck-boost DC/DC converter 100 according to an embodiment will be described with reference to FIGS. 6 to 22.

Figure 6:
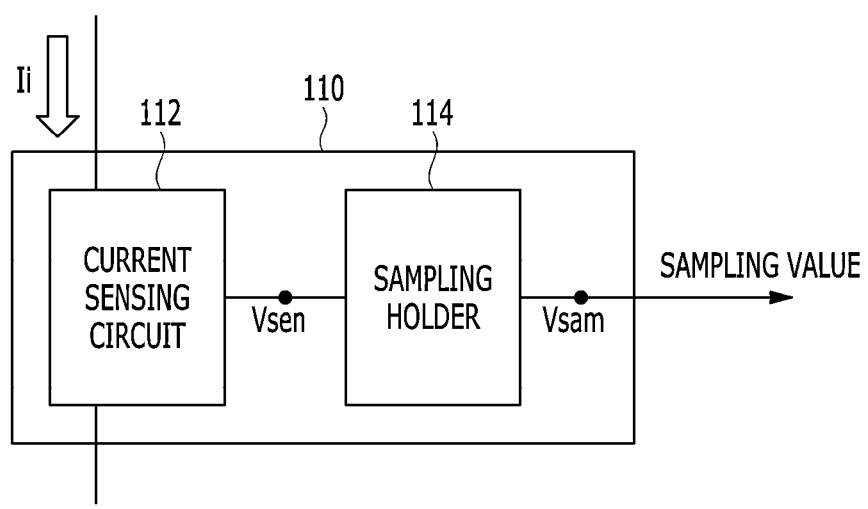
FIG. 6 is a diagram showing a configuration of a sensing circuit of FIG. 1.
Figure 7:
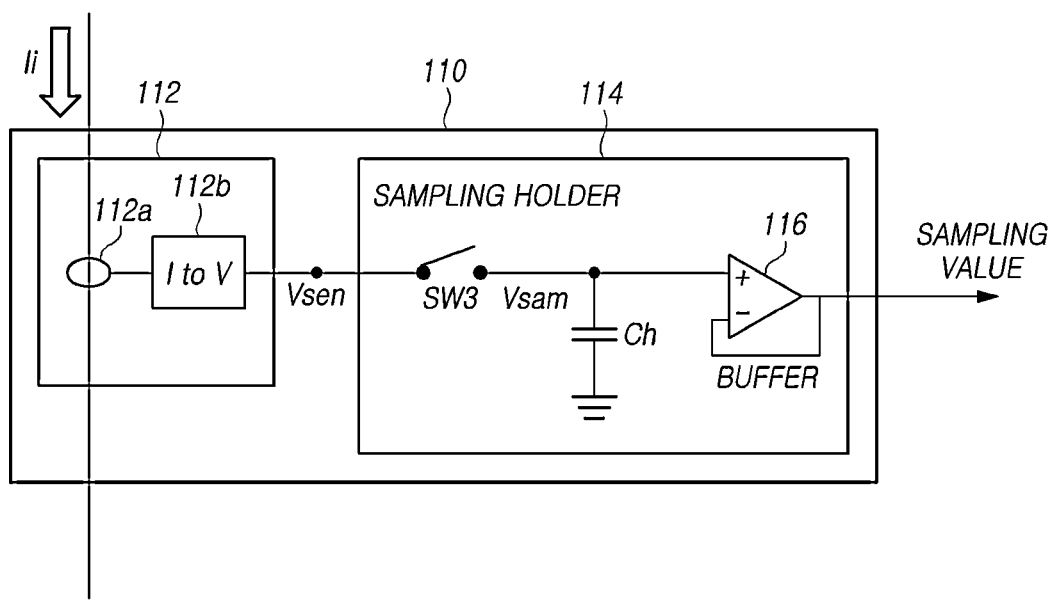
FIG. 7 is a diagram showing an example of the sensing circuit of FIG. 6.

FIG. 6 is a diagram showing a configuration of the sensing circuit of FIG. 1. FIG. 7 is a diagram showing an example of the sensing circuit of FIG. 6.

Referring to FIGS. 6 and 7, the sensing circuit 110 may include a current sensing circuit 112 that senses a current Ii flowing from the input node and generates a sensing voltage Vsen, and a sampling holder 114 that samples the sensing voltage Vsen. In this case, the sensing circuit 110 may provide the sensing voltage Vsen as a sampling value SAMPLING VALUE to the second control circuit 130.

The current sensing circuit 112 includes a current sensor 112a and a current-voltage converter 112b.

The current sensor 112a may be classified as, for example, a resistance detection type or a magnetic field detection type according to current detection type. The current detection type current sensor 112a is a contact type, and based on a current flowing through a shunt resistor, measures a voltage drop due to the shunt resistor, and thus can measure the current Ii. The magnetic field detection type current sensor 112a may include a core, and can measure a current by measuring the magnitude of a magnetic field generated in the core due to the current flowing through a current line. As the current sensor 112a of another magnetic field detection type, a current sensor using a Hall sensor without a core may also be used.

The current-voltage converter 112b may output a sensing voltage Vsen that is a voltage corresponding to the current measured by the current sensor 112a. The sensing voltage Vsen indicates the current Ii flowing through the input node, and may be 0 when no current flows and a value corresponding to a current when the current flows.

The sampling holder 114 may be connected to the current sensing circuit 112 to sample the sensing voltage Vsen of the current sensing circuit 112. Further, the sampling holder 114 may hold a sampling voltage that is a value obtained by sampling the sensing voltage Vsen.

The sensing circuit 110 may provide the sampling voltage Vsam sampled and held through the sampling holder 114 to the second control circuit 130 as a sampling value SAMPLING VALUE.

Referring to FIG. 7, the sampling holder 114 may include a hold capacitor Ch for holding the sampling voltage Vsam, a third switch SW3 which is turned on to sample the sensing voltage Vsen and turned off to hold the sampling voltage Vsam, and a buffer 116 for maintaining the sampling voltage Vsam.

The hold capacitor Ch is a capacitive element capable of maintaining the sampling voltage Vsam obtained by sampling the sensing voltage Vsen generated through the current sensing circuit 112.

The third switch SW3 is disposed between the output of the current sensing circuit 112 and the hold capacitor Ch. When the third switch SW3 is turned on, the sensing voltage Vsen, which is the output of the current sensing circuit 112, is applied to the hold capacitor Ch and thus the hold capacitor Ch can be charged with the sensing voltage Vsen. On the other hand, when the third switch SW3 is turned off, the current between the current sensing circuit 112 and the hold capacitor Ch is cut off and thus the charge charged in the hold capacitor Ch can be maintained.

The buffer 116 is also referred to as a voltage follower and may be implemented by inputting the output of the operational amplifier to the inverting input terminal without connection with a feedback resistor. At this time, the terminal of the third switch SW3 on the side of the hold capacitor Ch, the hold capacitor Ch, and the input terminal of the buffer 116 can be connected to one node.

Since the input impedance of the buffer 116 is very high, little current flows therethrough. The buffer 116 may transfer the voltage of the non-inverting input side of the operational amplifier to the other side while continuously maintaining the voltage. Accordingly, the buffer 116 can maintain the voltage generated in the hold capacitor Ch while preventing discharge of the charge charged in the hold capacitor Ch.

The sampling holder 114 may turn off the third switch SW3 at a specific point in time to constantly maintain the voltage generated in the hold capacitor Ch between the third switch SW3 and the buffer 116.

Figure 8:
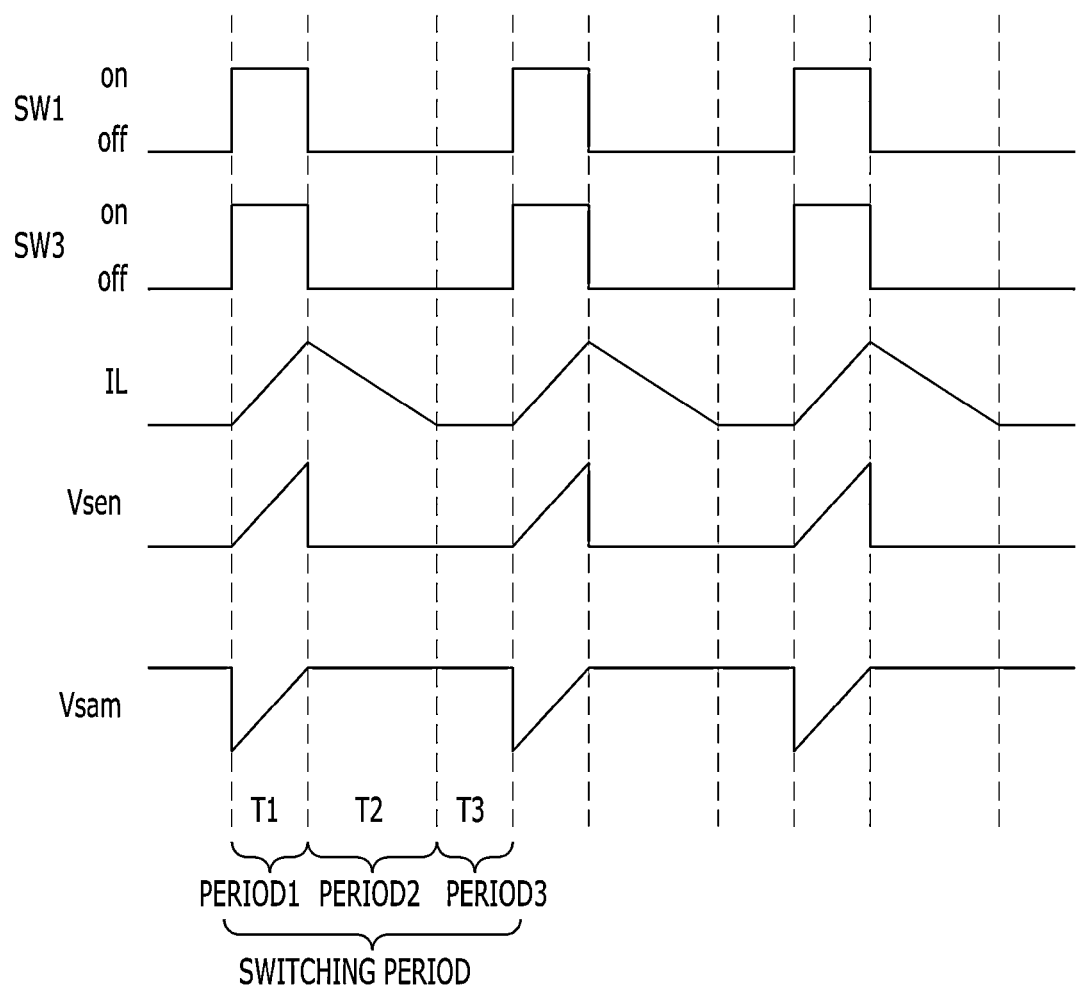
FIG. 8 is a diagram showing on-off timings of the first switch and the third switch, an inductor current, a sensing voltage, and a sampling voltage in FIG. 1.

FIG. 8 is a diagram showing on-off timings of the first switch and the third switch, the inductor current, the sensing voltage, and the sampling voltage in FIG. 1.

Referring to FIG. 8, the first switch SW1 and the third switch SW3 are turned on at the start of the first time period PERIOD1 and are turned off when the first time period PERIOD1 ends.

In the first time period PERIOD1, the first switch SW1 is turned on and thus a current flows from the input node Ni and the inductor current IL increases. As the inductor current IL increases, the sensing voltage Vsen, which is a value sensed by the current sensing circuit 112, increases. Since the sampling holder samples the increasing sensing voltage Vsen, the sampling voltage Vsam also increases.

At the end of the first time period PERIOD1, the first switch SW1 is turned off to cut off the current of the input node Ni. At this time, the current sensing circuit 112 outputs the sensing voltage Vsen as 0. Although the sensing voltage Vsen becomes 0, the sampling holder 114 may hold and maintain the sampling voltage Vsam through the third switch SW3 and the buffer 116.

Figure 9:
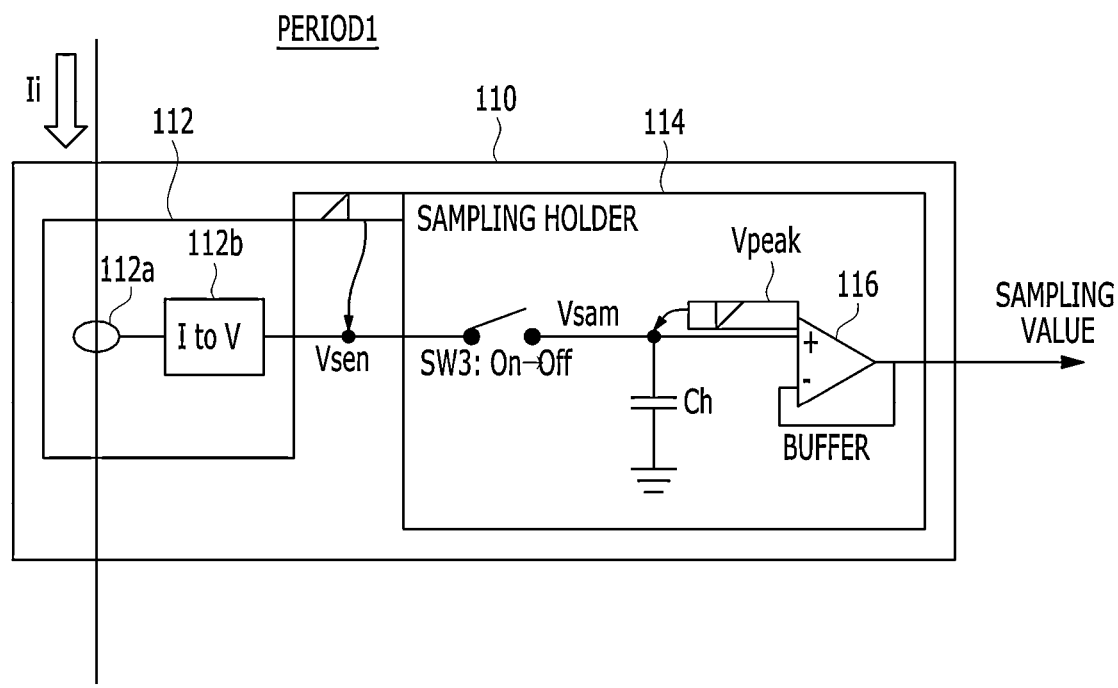
FIG. 9 is a diagram showing a state of a sampling holder with respect to the operation of the third switch during the first time period in the buck-boost DC/DC converter of FIG. 1.

FIG. 9 is a diagram showing a state of the sampling holder with respect to the operation of the third switch during the first time period in the buck-boost DC/DC converter of FIG. 1.

Referring to FIG. 9, the third switch SW3 may be turned on at the start of the first time period PERIOD1 to apply the sensing voltage Vsen to the hold capacitor Ch such that the sensing voltage Vsen is sampled. The third switch SW3 may be turned off during the first time period PERIOD1 to hold a peak value Vpeak of the sampling voltage Vsam.

In this case, the peak value Vpeak of the sampling voltage Vsam may be transmitted as the sampling value SAMPLING VALUE of the second control circuit 130.

When the third switch SW3 is turned on at the start of the first time period PERIOD1, the sensing voltage Vsen and the sampling voltage Vsam are applied as the same voltage. Here, the hold capacitor Ch may be charged with the same value as the sensing voltage Vsen.

At the end of the first time period PERIOD1, the first switch SW1 is turned off to cut off the current Ii of the input node Ni. Accordingly, the sensing voltage Vsen becomes zero. Like the first switch SW1, the third switch SW3 is turned off when the first time period PERIOD1 ends. Accordingly, the voltage value formed by the charge charged in the hold capacitor Ch is a peak value Vpeak of the sampling voltage Vsam corresponding to the peak value of the sensing voltage Vsen.

The movement of charges charged in the hold capacitor Ch is limited when the third switch SW3 is turned off.

In addition, leakage of the charges charged in the hold capacitor (Ch) may be prevented through the buffer 116. Therefore, the peak value Vpeak of the sampling voltage Vsam generated in the hold capacitor Ch can be provided to the second control circuit 130 as the sampling value while being maintained.

As described above, the second control circuit 130 can estimate the duration of the second time period PERIOD2 as will be described later through calculation based on the peak value Vpeak of the sampling voltage Vsam, which is the sampling value received from the sensing circuit 110.

Figure 10:
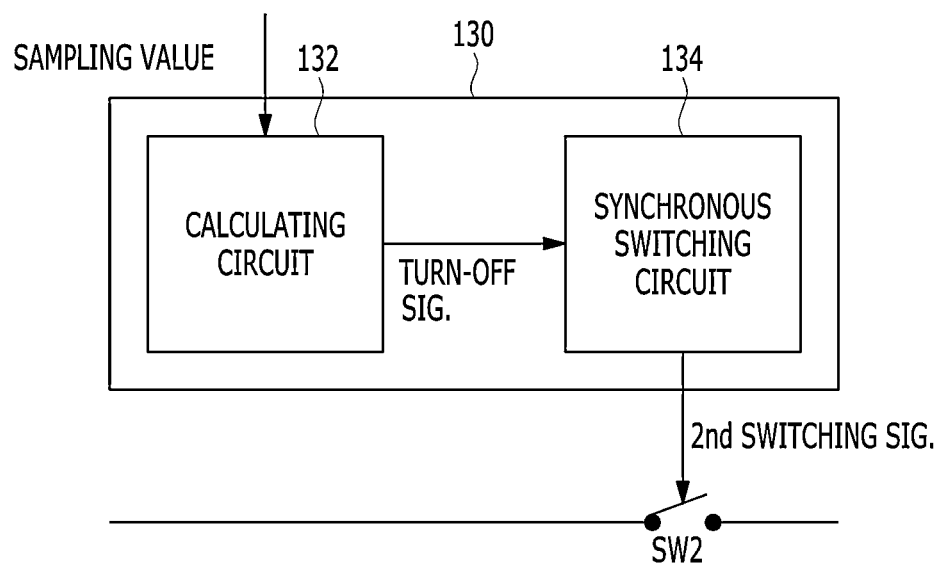
FIG. 10 is a diagram showing a configuration of a second control circuit of FIG. 1.

FIG. 10 is a diagram showing a configuration of the second control circuit of FIG. 1.

Referring to FIG. 10, the second control circuit 130 may include a calculating circuit 132 that calculates the duration of the second time period PERIOD2 from the sampling value SAMPLING VALUE to generate a turn-off signal TURN-OFF SIG and a synchronous switching circuit 134 that switches the second switch SW2 by generating a second switching signal second SWITCHING SIG. corresponding to the turn-off signal TURN-OFF SIG.

The calculating circuit 132 can be implemented in various ways, such as a digital method, an analog method, and a combination thereof. For example, it may include a digital circuit capable of calculating a turn-off magnitude based on the sampling value SAMPLING VALUE received from the sensing circuit 110. Further, the calculating circuit 132 may be implemented using an analog circuit.

The sampling value SAMPLING VALUE may indicate a peak value of the inductor current IL flowing during the first time period PERIOD1. When the rate of decrease of the inductor current IL per hour is known in the second time period PERIOD2, a estimated duration of the second time period PERIOD2, which is a duration in which the inductor current IL substantially becomes zero, can be calculated based on the sampling value SAMPLING VALUE.

The calculating circuit 132 may transfer the turn-off signal TURN-OFF SIG. to the synchronous switching circuit 134 at the end of the second time period PERIOD2 based on the estimated duration of the second time period PERIOD2.

The synchronous switching circuit 134 turns on the second switch SW2 at the start of the second time period PERIOD2 and turns off the second switch SW2 at the end of the second time period PERIOD2 such that the synchronous buck-boost DC/DC converter 100 operates.

In the case of an asynchronous buck-boost DC/DC converter, a diode may be used instead of the second switch SW2. In this case, the diode generally has a higher resistance than a thin film transistor that can be used as the second switch SW2, for example, a MOSFET device, and thus a relatively high loss may occur. On the other hand, in the case of the synchronous buck-boost DC/DC converter 100, a switch having a relatively lower resistance than that of a diode may be used instead of a diode, and thus the efficiency of power transmission can be improved. In addition, the board cost can be reduced by not using diodes, which are relatively expensive than thin film transistors.

Meanwhile, the synchronous switching circuit 134 may turn on the second switch SW2 after the first switch SW1 is turned off in order to prevent the input voltage Vi of the input node Ni from being output to the output node No without passing through the inductor L.

Figure 11:
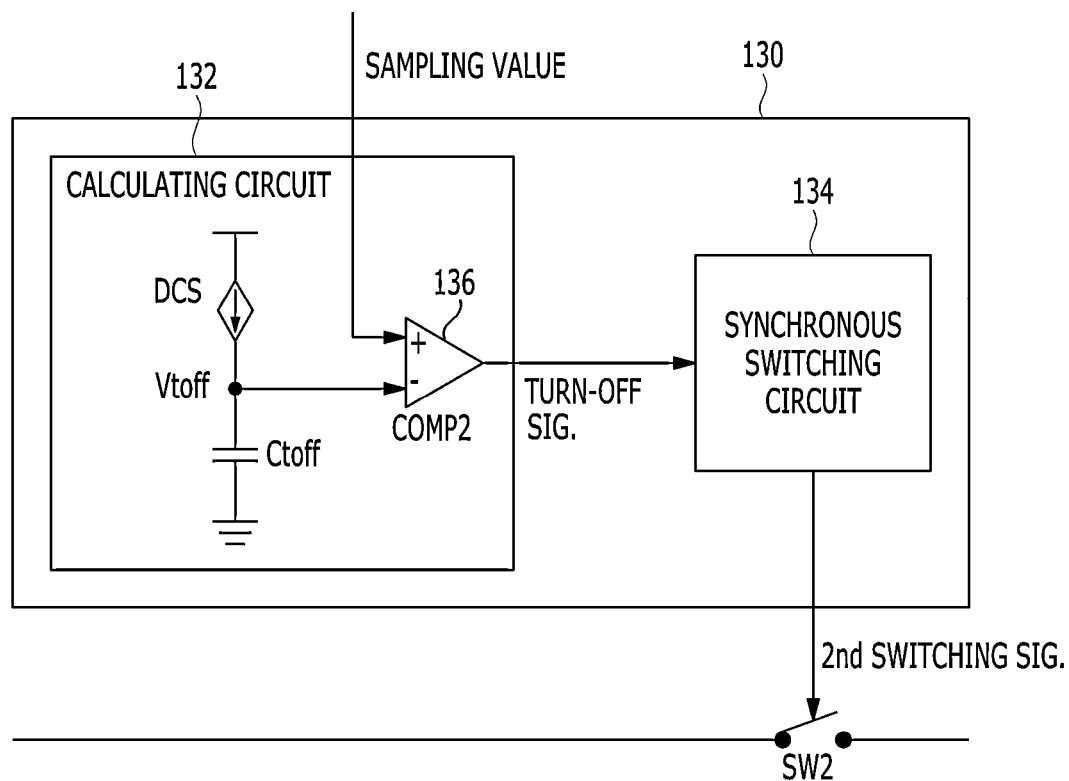
FIG. 11 is a diagram showing an example of a calculating circuit of FIG. 10.

FIG. 11 is a diagram showing an example of the calculating circuit of FIG. 10.

Referring to FIG. 11, the calculating circuit 132 may include a dependent current source DCS, a turn-off capacitor Ctoff for charging with the current provided by the dependent current source DCS, and a second comparator 135 that compares the sampling value SAMPLING VALUE with a voltage Vtoff generated in the turn-off capacitor Ctoff and generates the turn-off signal TURN-OFF SIG.

The dependent current source DCS refers to a current source that constantly flows a current determined by another voltage or current. The current generated by the dependent current source DCS may charge the turn-off capacitor Ctoff.

The turn-off capacitor Ctoff may be charged with the current from the dependent current source DCS to generate the turn-off voltage Vtoff. The turn-off voltage Vtoff of the turn-off capacitor Ctoff is used to estimate the duration of the second time period PERIOD2.

The second comparator 136 may estimate the duration of the second time period PERIOD2 by comparing the sampling voltage Vsam received from the sensing circuit 110 with the turn-off voltage Vtoff. The second comparator 136 may be implemented using a pulse width modulator.

Here, the amount of increase per hour of the voltage Vtoff generated in the turn-off capacitor Ctoff is determined depending on the current from the dependent current source DCS and the capacity of the turn-off capacitor Ctoff. The current of the dependent current source DCS and the capacity of the turn-off capacitor Ctoff may be set such that the voltage Vtoff generated in the turn-off capacitor Ctoff during the second time period PERIOD2 becomes equal to the sampling value SAMPLING VALUE.

Accordingly, the second comparator 136 may generate the turn-off signal TURN-OFF SIG. which is output as a low level when the voltage Vtoff generated in the turn-off capacitor Ctoff is less than the sampling value SAMPLING VALUE and output as a high level when the voltage Vtoff becomes equal to the sampling value SAMPLING VALUE to turn off the second switch SW2. Here, low and high levels represent relatively small and large values and are not limited to specific values.

Figure 12:
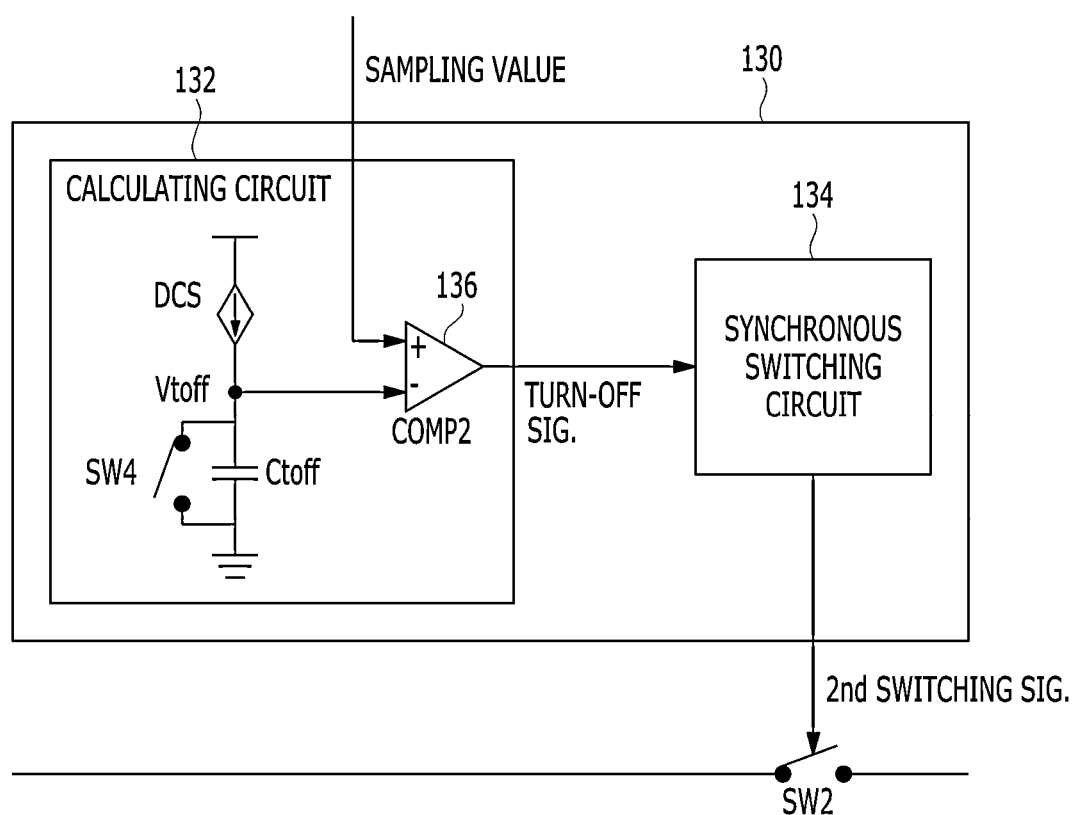
FIG. 12 is a diagram showing another example of the calculating circuit of FIG. 10.

FIG. 12 is a diagram showing another example of the calculating circuit of FIG. 10.

Referring to FIG. 12, the calculating circuit 132 may include a fourth switch SW4 which is disposed in parallel to the turn-off capacitor Ctoff, discharges the turn-off capacitor Ctoff when turned on, and charges the turn-off capacitor Ctoff when turned off.

The fourth switch SW4 may periodically discharge the turn-off capacitor Ctoff charged with the current of the dependent current source DCS to initialize the voltage Vtoff generated in the turn-off capacitor Ctoff.

When the fourth switch SW4 is turned on, both ends of the turn-off capacitor Ctoff disposed in parallel to the fourth switch SW4 may be connected to, for example, the ground. Accordingly, the turn-off capacitor Ctoff may be discharged and reset. On the other hand, when the fourth switch SW4 is turned off, the current from the dependent current source DCS is not discharged to the ground and is charged in the turn-off capacitor Ctoff to generate the voltage value Vtoff.

The calculating circuit 132 may compare the voltage value Vtoff generated in the turn-off capacitor Ctoff with the sampling value SAMPLING VALUE at every switching cycle through periodic switching of the fourth switch SW4 to estimate the duration of the second time period PERIOD2.

Figure 13:
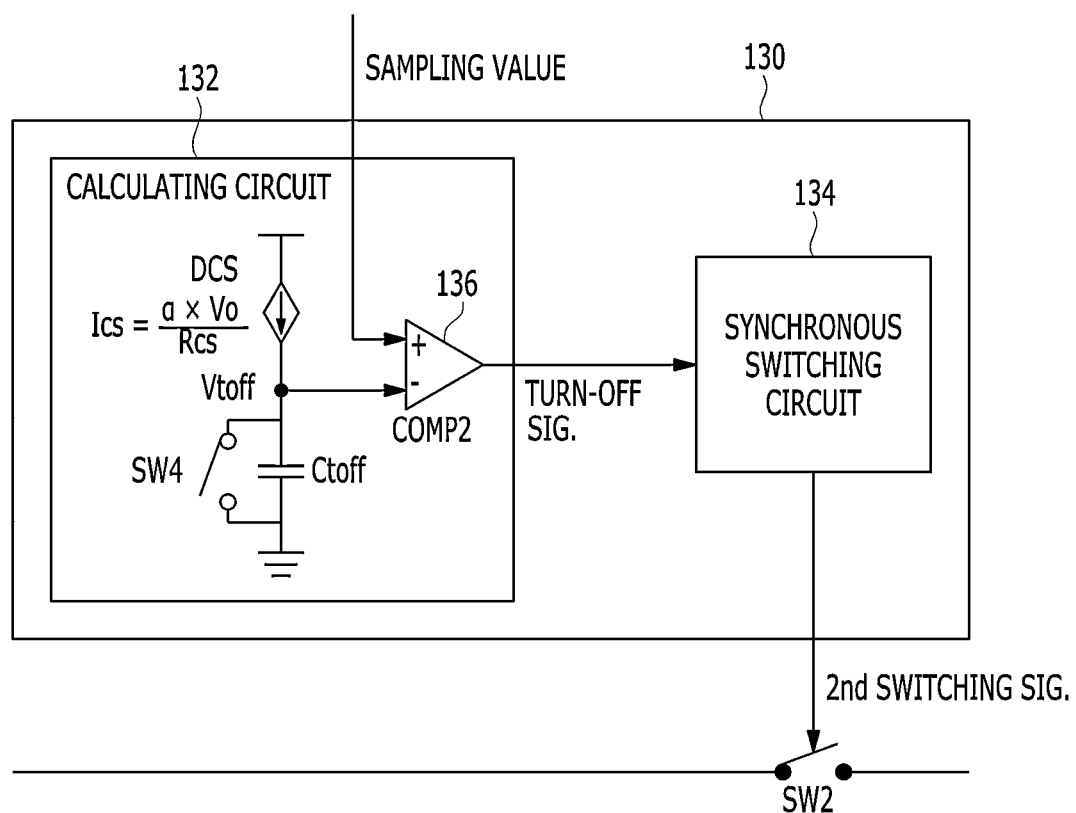
FIG. 13 is a diagram showing an example of a current value of a dependent current source of FIG. 12.
Figure 14:
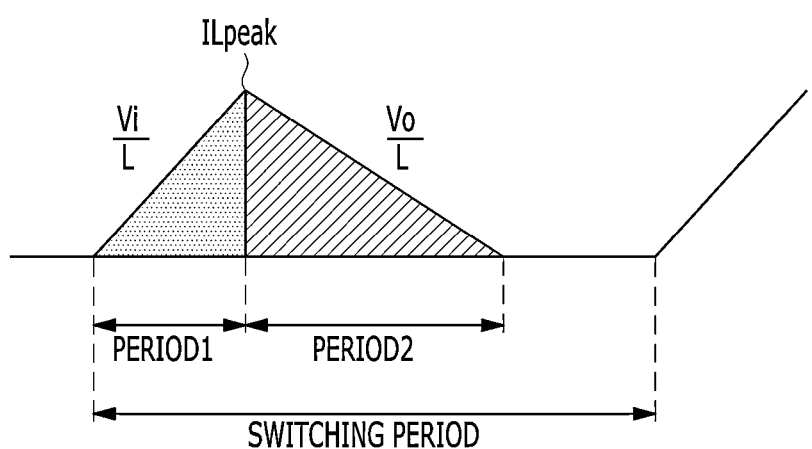
FIG. 14 is a diagram showing a relationship between the duration of the second time period and a maximum current generated in the inductor in the buck-boost DC/DC converter of FIG. 1.

FIG. 13 is a diagram showing an example of the current value of the dependent current source of FIG. 12. FIG. 14 is a diagram showing a relationship between the duration of the second time period and a maximum current formed in the inductor in the buck-boost DC/DC converter of FIG. 1.

Referring to FIGS. 13 and 14, the current value Ics of the dependent current source DCS may be determined by the output voltage Vo.

As described above, the voltage of the dependent current source DCS refers to a current source that constantly flows a current proportional to another voltage or current.

Meanwhile, as shown in FIG. 14, in the buck-boost DC/DC converter 100, formula 1 is established among the duration of the second time period PERIOD2, the output voltage, the inductance of the inductor, and the maximum current formed in the inductor L.

$$T2 \times Vo = L \times ILpeak \qquad \text{[Formula 1]}$$

T2 is the duration of the second time period PERIOD2, Vo is the output voltage, L is the inductance of the inductor, and ILpeak is the maximum current formed in the inductor L.

In this case, the duration T2 of the second time period PERIOD2 may be calculated from the maximum current ILpeak formed in the inductor L and the output voltage Vo according to formula 2.

$$T2 = \frac{L \times ILpeak}{Vo} \qquad \text{[Formula 2]}$$

If the current value Ics of the dependent current source DCS is determined to be proportional to the output voltage Vo, the magnitude of the second time period PERIOD2 can be estimated based on the sampling value SAMPLING VALUE corresponding to the maximum current ILpeak formed in the inductor L received from the sensing circuit 110 and the current value Ics of the dependent current source DCS.

Accordingly, the current value of the dependent current source DCS may be set to correspond to Formula 3.

$$Ics = \frac{\alpha \times Vo}{Rcs} \qquad \text{[Formula 3]}$$

Ics is the current value of the dependent current source DCS, Vo is the output voltage, and α and Rcs are set values.

The second comparator COMP2 generates the turn-off signal TURN-OFF SIG. when the sampling value SAMPLING VALUE is identical to the voltage value Vcoff formed in the turn-off capacitor Ctoff formed by the dependent current source DCS. Therefore, the capacitance of the turn-off capacitor Ctoff, α, and Rcs may be set such that the voltage value Vcoff formed in the turn-off capacitor Ctoff during the second time period PERIOD2 becomes equal to the sampling value SAMPLING VALUE.

Meanwhile, the duration T2 of the second time period PERIOD2 may be determined using formula 4.

$$T2 = \frac{\text{SAMPLING VALUE} \times Ctoff \times Rcs}{\alpha \times Vo} \qquad \text{[formula 4]}$$

Here, T2 is the duration of the second time period PERIOD2, SAMPLING VALUE is the sampling value, Coff is the capacity of the turn-off capacitor Ctoff, Rcs and a are set values of the dependent current source DCS, and Vo is the output voltage.

The amount of charges charged in the turn-off capacitor by the current value Ics of the dependent current source during a charging time $T_{CH}$ is the same as the amount of charges charged by the capacitance Coff of the turn-off capacitor Ctoff and the voltage Vtoff generated in the turn-off capacitor Ctoff. Here, when the voltage Vtoff generated in the turn-off capacitor Ctoff is equal to the sampling value SAMPLING VALUE, the turn-off signal is triggered to HIGH by the second comparator. Accordingly, the voltage Vtoff generated in the turn-off capacitor Ctoff may be replaced with the sampling value SAMPLING VALUE. This can be expressed by formula 5.

$$T_{CH} = \frac{Vtoff \times Ctoff}{Ics} = \frac{\text{SAMPLING VALUE} \times Ctoff}{Ics} \qquad \text{[Formula 5]}$$

Meanwhile, the current value Ics of the dependent current source DCS may be represented by the output voltage Vo, Rcs and α, which are set values of the dependent current source DCS, using the aforementioned formula 3.

In this case, formula 4 may be derived using formula 5 and formula 3. Further, formula 6 may be derived using formula 2 and formula 4.

$$L \times I_{Lpeak} \approx \frac{\text{SAMPLING VALUE} \times Ctoff \times R_{CS}}{\alpha} \qquad \text{[Formula 6]}$$

Accordingly, if the inductance L of the inductor, the peak value (ILpeak) of the inductor current IL, the capacitance of the turn-off capacitor Ctoff corresponding to the sampling value SAMPLING VALUE, and the set values Rcs and a of the dependent current source DCS are determined to satisfy formula 6, the magnitude T2 of the second time period PERIOD2 may be estimated in the calculating circuit.

Figure 15:
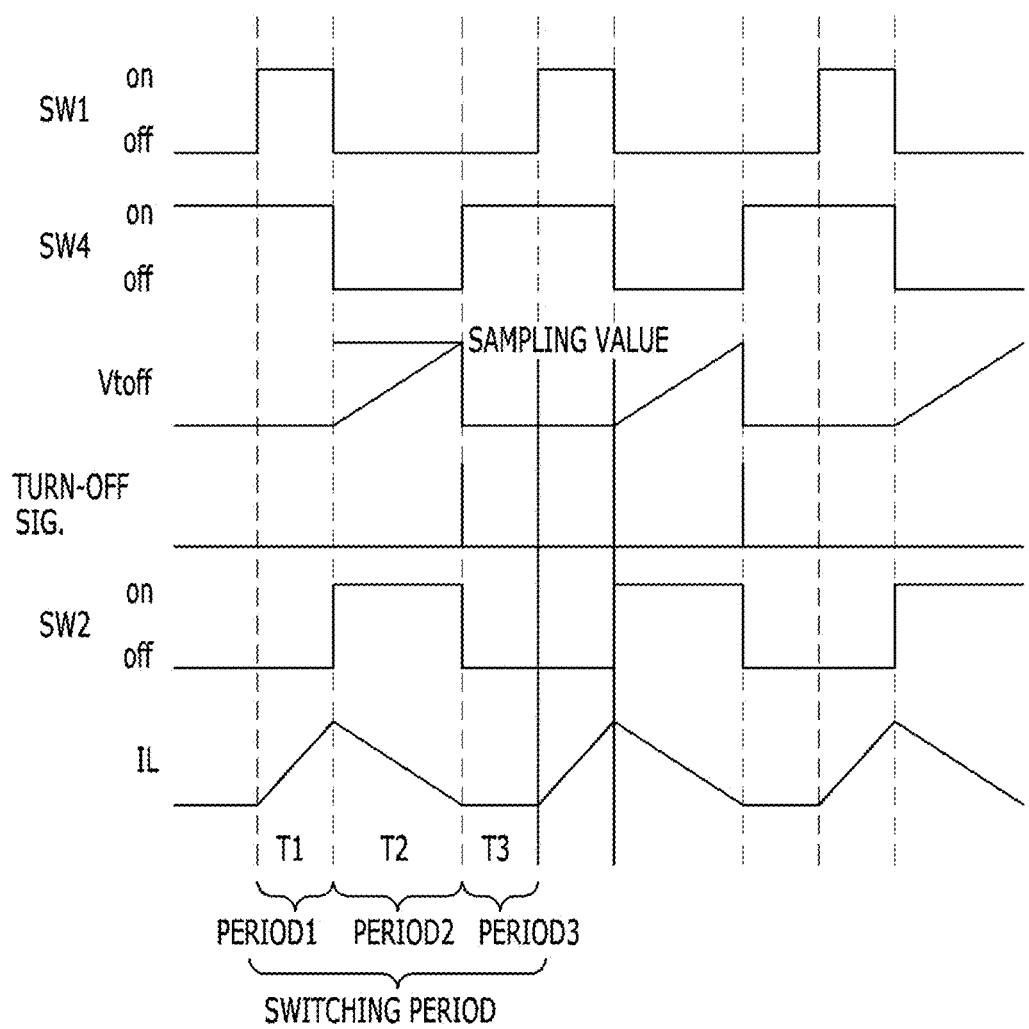
FIG. 15 is a diagram showing on-off timings of the first switch, the second switch, and the fourth switch, a voltage generated in a turn-off capacitor, a turn-off signal, and an inductor current in FIG. 1.

FIG. 15 is a diagram showing on-off timings of the first switch, the second switch, and the fourth switch, the voltage formed in the turn-off capacitor, the turn-off signal, and the inductor current in FIG. 1.

Referring to FIG. 15, the first switch SW1 is turned on during the first time period PERIOD1 to increase the inductor current IL.

When the first time period PERIOD1 ends, the first switch SW1 is turned off and the second time period PERIOD2 starts. At this time, the second switch SW2 is turned on to transfer the current built up in the inductor to the output node Vo, and the inductor current IL decreases over time.

The fourth switch SW4 is turned off at the start of the second time period PERIOD2, and the voltage Vtoff generated in the turn-off capacitor Ctoff increases over time.

A high turn-off signal TURN-OFF SIG. is generated when the voltage Vtoff generated in the turn-off capacitor becomes equal to the sampling value SAMPLING VALUE, and thus the second switch SW2 is turned off.

The fourth switch SW4 may be turned on when the second time period PERIOD2 ends.

Further, the voltage Vtoff generated in the turn-off capacitor Ctoff may be initialized before the next switching period. In this case, the initialization time may be easily changed by a person skilled in the art in the third time period PERIOD3 between the end of the second time period PERIOD2 and the start of the next switching period.

Figure 16:
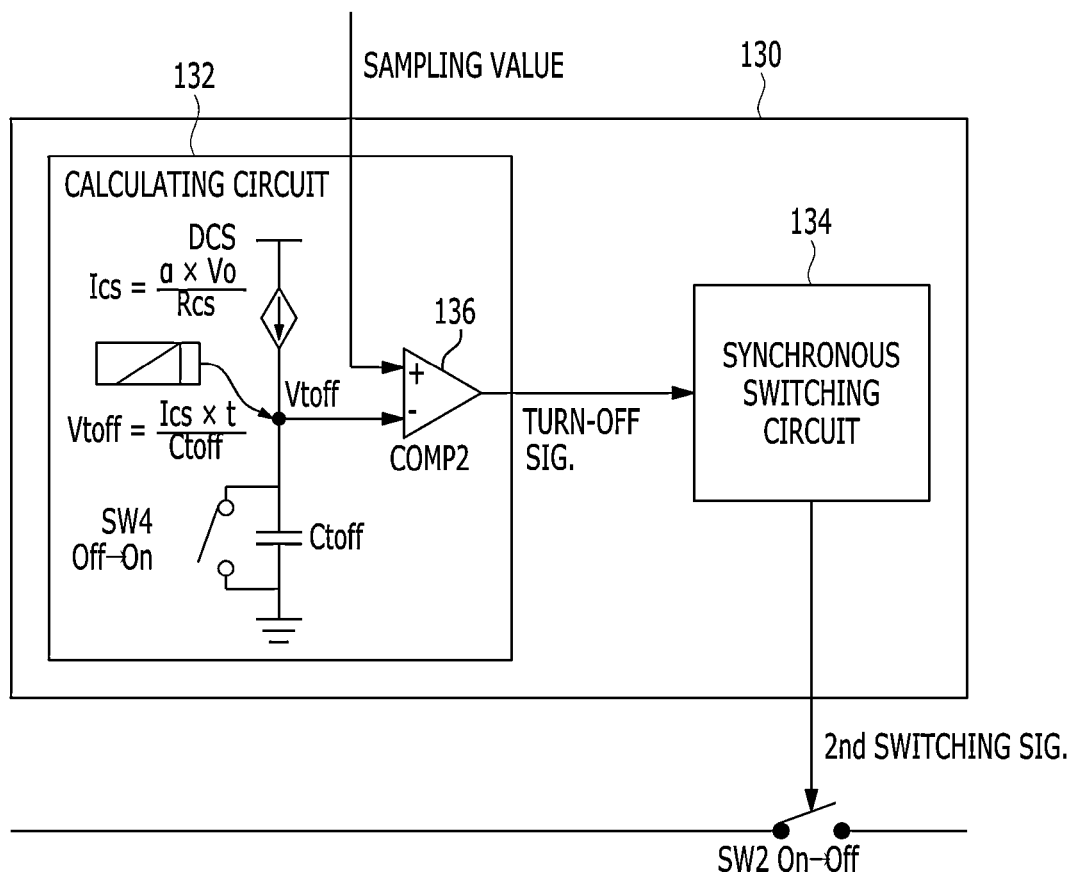
FIG. 16 is a diagram showing a state of the calculating circuit with respect to the operation of the fourth switch during the second time period in the buck-boost DC/DC converter of FIG. 1.

FIG. 16 is a diagram showing a state of the calculating circuit with respect to the operation of the fourth switch during the second time period in the buck-boost DC/DC converter of FIG. 1.

The fourth switch SW4 may be turned off at the start of the second time period PERIOD2 to charge the turn-off capacitor Ctoff and may be turned on at the end of the second time period PERIOD2 to discharge the capacitor Ctoff.

The calculating circuit 132 may turn off the fourth switch SW4 at the start of the second time period PERIOD2. As described above, the amount of charges corresponding to the current value Ics of the dependent current source DCS is charged in the turn-off capacitor Ctoff according to turn-off of the fourth switch SW4. The voltage value Vtoff formed in the turn-off capacitor Ctoff increases over time.

When the voltage value Vtoff formed in the turn-off capacitor Ctoff by the current value Ics of the dependent current source DCS becomes equal to the sampling value SAMPLING VALUE After the duration T2 of the second time period PERIOD2 has elapsed, a high turn-off signal TURN-OFF SIG. is generated by the second comparator COMP2.

The high turn-off signal TURN-OFF SIG. is transmitted to the synchronous switching circuit 134, and the synchronous switching circuit 134 turns off the second switch in a turned-on state.

After the second switch SW2 is turned off, the fourth switch SW4 may be turned on by the calculating circuit 132 to discharge the turn-off capacitor Ctoff. Accordingly, the voltage value Vtoff formed in the turn-off capacitor Ctoff can be initialized.

It is possible to provide the synchronous buck-boost DC/DC converter 100 in which the second switch SW2 is controlled by the operation of the fourth switch SW4 and the second switch SW2 is used instead of a diode. In addition, it is possible to provide the buck-boost DC/DC/converter 100 including a period in which the inductor current IL becomes substantially zero.

Figure 17:
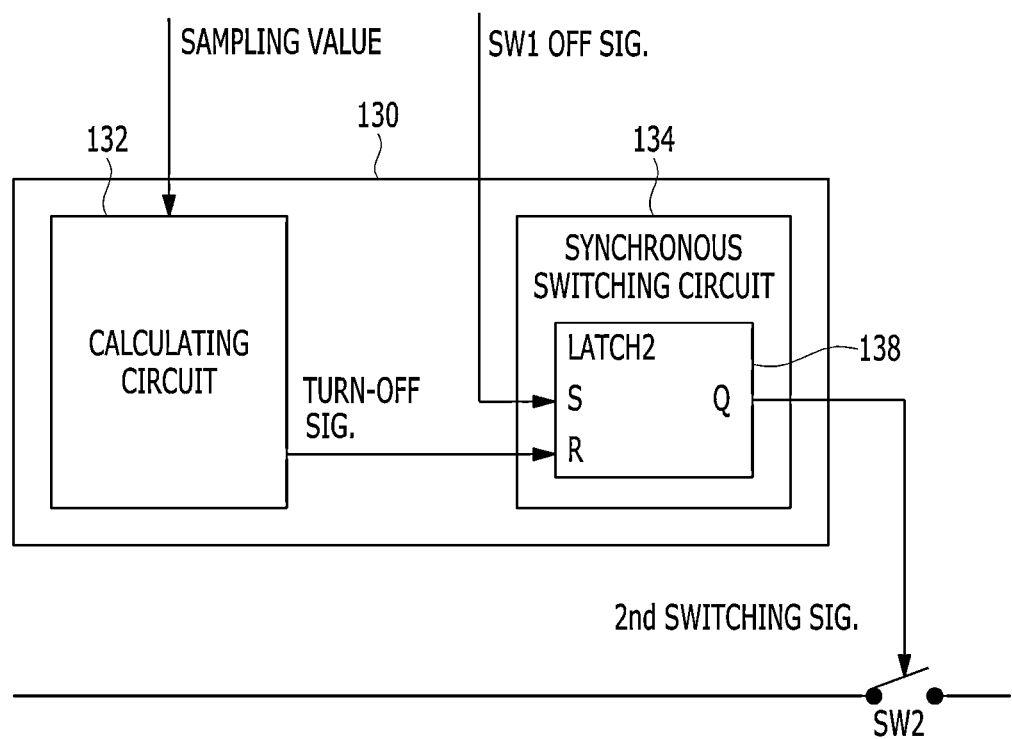
FIG. 17 is a diagram showing an example of a synchronous switching circuit of FIG. 10.

FIG. 17 is a diagram showing an example of the synchronous switching circuit of FIG. 10.

Referring to FIG. 17, the synchronous switching circuit 134 may include a second latch 138. The synchronous switching circuit may input a signal SW1 OFF SIG. corresponding to turn-off of the first switch and the turn-off signal TURN-OFF SIG. to the second latch 138 to transmit a second switching signal second SWITCHING SIG. to the second switch SW2.

As an example, the second latch 138 may be an S-R latch.

The signal SW1 OFF SIG. corresponding to turn-off of the first switch SW1 may be input to the setup terminal S of the second latch 138. The second latch 138 may turn on the second switch SW2 after the first switch is turned off through the second switching signal second SWITCHING SIG. according to the setup input of the setup terminal S.

Meanwhile, the turn-off signal TURN-OFF SIG. may be input to the reset terminal R of the second latch 138. The second latch 138 may turn off the second switch SW2 at the end of the second time period PERIOD2 through the second switching signal second SWITCHING SIG. according to the reset input of the reset terminal R.

The second latch 138 may control the second switch SW2 according to the alternation of the setup input and the reset input.

Figure 18:
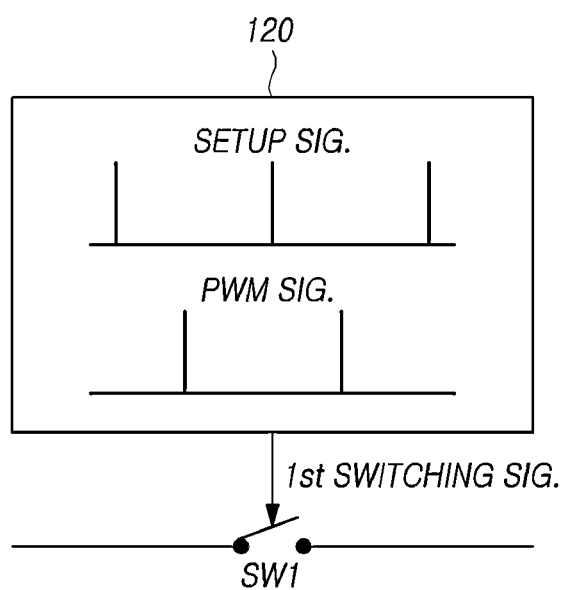
FIG. 18 is a diagram showing a first control circuit of FIG. 1.

FIG. 18 is a diagram showing the first control circuit of FIG. 1.

Referring to FIG. 18, the first control circuit 120 may generate a setup signal SETUP SIG. for determining a switching period and a pulse width modulation signal PWM SIG. for determining the first time period PERIOD1 of the switching period and transmit the first switching signal to the first switch SW1 according to the alternation of the setup signal SETUP SIG and the pulse width modulation signal PWM SIG.

The setup signal SETUP SIG. is a signal for determining the switching period of the buck-boost DC/DC converter 100.

If the interval of the setup signal SETUP SIG. increases, the switching period may increase. On the other hand, if the interval of the setup signal SETUP SIG. is reduced, the switching period may decrease.

The first control circuit 120 may generate a setup signal SETUP SIG. corresponding to a switching period required for the buck-boost DC/DC converter 100. The first control circuit 120 may turn on the first switch SW1 through the first switching signal first SWITCHING SIG. whenever the setup signal SETUP SIG. is generated.

Meanwhile, the first control circuit 120 may generate the pulse width modulation signal PWM SIG. for determining the interval of the first time period PERIOD1 between setup signals SETUP SIG. The first switch SW1 may be turned off by the pulse width modulation signal PWM SIG. of the first control circuit 120.

The first time period PERIOD1 corresponds to the time when the first switch SW1 is turned on and increases as the interval between the setup signal SETUP SIG. and the pulse width modulation signal PWM SIG. of one cycle increases. On the other hand, as the interval between the setup signal SETUP SIG. and the pulse width modulation signal PWM SIG. decreases, the duration of the first time period PERIOD1 decreases.

The first control circuit 120 may control the first switch SW1 by transmitting the first switching signal first SWITCHING SIG. according to the alternation of the setup signal SETUP SIG. and the pulse width modulation signal PWM SIG. to the first switch.

Figure 19:
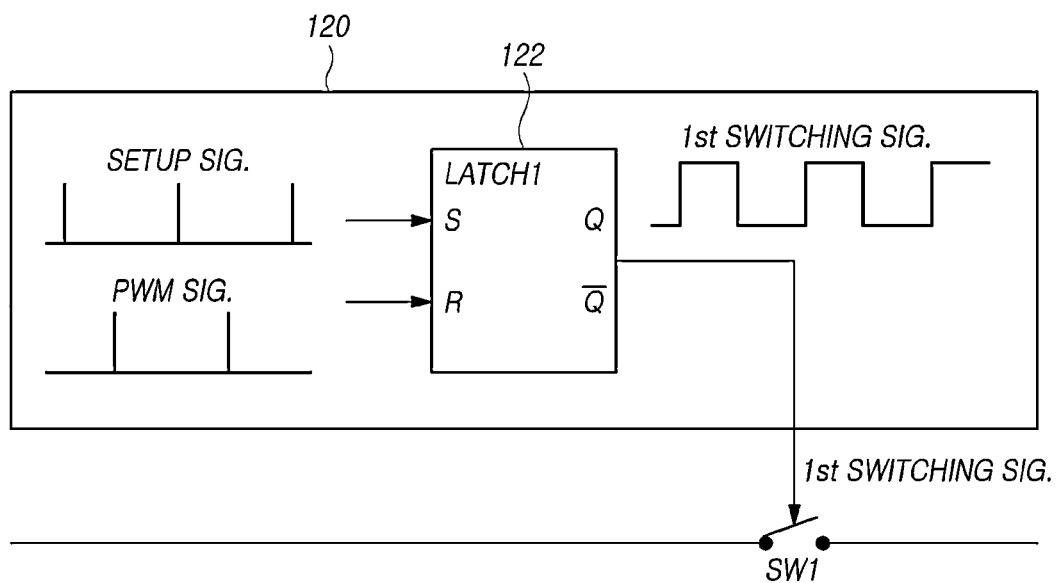
FIG. 19 is a diagram showing an example of the first control circuit of FIG. 1.

FIG. 19 is a diagram showing an example of the first control circuit of FIG. 1.

Referring to FIG. 19, the first control circuit 120 may include a first latch 122. Here, the first control circuit 120 may generate the first switching signal first SWITCHING SIG. by inputting the setup signal SETUP SIG. and the pulse width modulation signal PWM SIG. to the first latch 122.

As an example, the first latch 122 may be an S-R latch.

The setup signal SETUP SIG. corresponding to turn-on of the first switch SW1 may be input to the setup terminal S of the first latch 122. Meanwhile, the pulse width modulation signal PWM SIG. corresponding to turn-off of the first switch SW1 may be input to the reset terminal R of the first latch 122.

The first latch 122 may generate the first switching signal first SWITCHING SIG. according to the alternation of the setup signal SETUP SIG. and the pulse width modulation signal PWM SIG.

In this case, the first switching signal first SWITCHING SIG. may be transmitted to the first switch SW1 in the form of a square wave.

Figure 20:
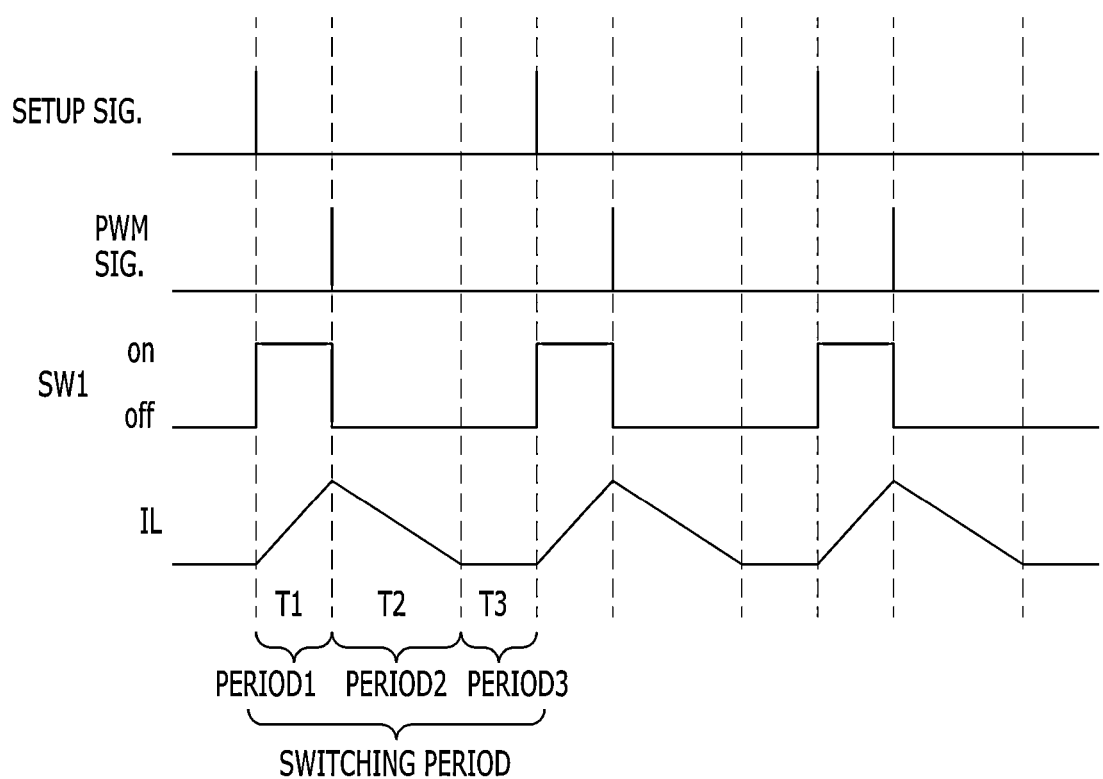
FIG. 20 is a diagram showing timings of a setup signal and a pulse width modulation signal, on-off timing of the first switch, and an inductor current in the buck-boost DC/DC converter of FIG. 1.

FIG. 20 is a diagram showing timings of the setup signal and the pulse width modulation signal, on-off timing of the first switch, and the inductor current in the buck-boost DC/DC converter of FIG. 1.

Referring to FIG. 20, the setup signal SETUP SIG. is repeatedly generated for respective switching periods. The pulse width modulation signal PWM SIG. is generated following the setup signal SETUP SIG having an interval of the first time period PERIOD1 from the setup signal SETUP SIG.

The first switch SW1 is turned on by the setup signal SETUP SIG. and a current flows from the input node Ni to the inductor L, and thus the inductor current IL increases. On the other hand, the first switch SW1 is turned off by the pulse width modulation signal PWM SIG. and the current flowing from the input node Ni to the inductor L is cut off, and thus the inductor current IL does not increase.

Figure 21:
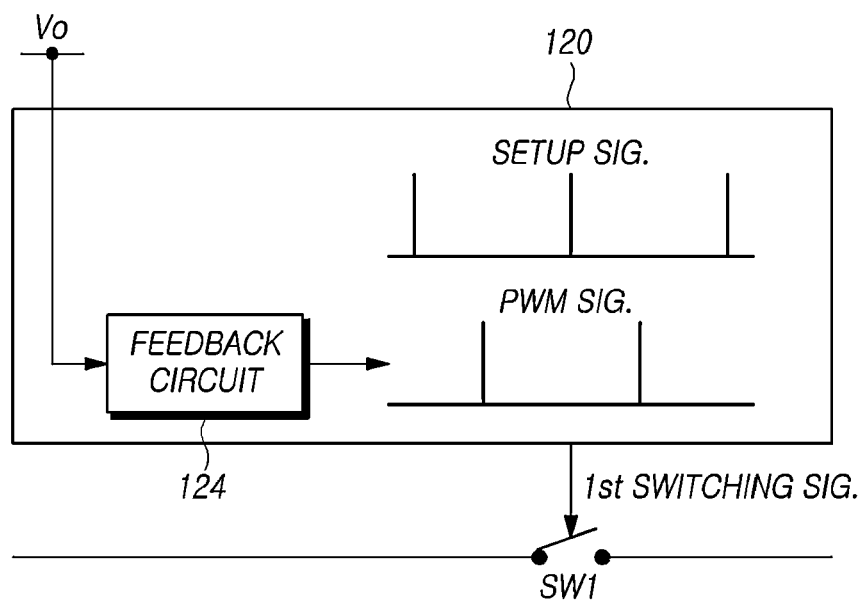
FIG. 21 is a diagram showing generation of a pulse width modulation signal by a feedback circuit included in the first control circuit of FIG. 1.

FIG. 21 is a diagram showing that a feedback circuit included in the first control circuit of FIG. 1 generates the pulse width modulation signal.

Referring to FIG. 21, the first control circuit 120 may include a feedback circuit 124 that generates the pulse width modulation signal PWM SIG.

As an example, the feedback circuit 124 may operate in a voltage mode. In this case, the feedback circuit 124 may receive the output voltage Vo as a feedback. The feedback circuit 124 may amplify an error by comparing the output voltage Vo divided through a resistor with a reference voltage. The amplified error may be compensated by a compensator of the feedback circuit 124. The feedback circuit 124 may generate a pulse width modulation control signal PWM CONTROL SIGNAL by comparing the compensation value of the amplified error result with sawtooth or triangle waves generated in the feedback circuit 124.

However, when the feedback circuit 124 is in the voltage mode, the feedback circuit 124 cannot respond if the output voltage does not fluctuate. In addition, in the continuous conduction mode (CCM) and the discontinuous conduction mode (DCM), the compensation value needs to be different depending on whether the operation mode is the CCM mode or the DCM mode in a 1-pole system and a 2-pole system. Meanwhile, the feedback circuit 124 may operate in a current mode.

Figure 22:
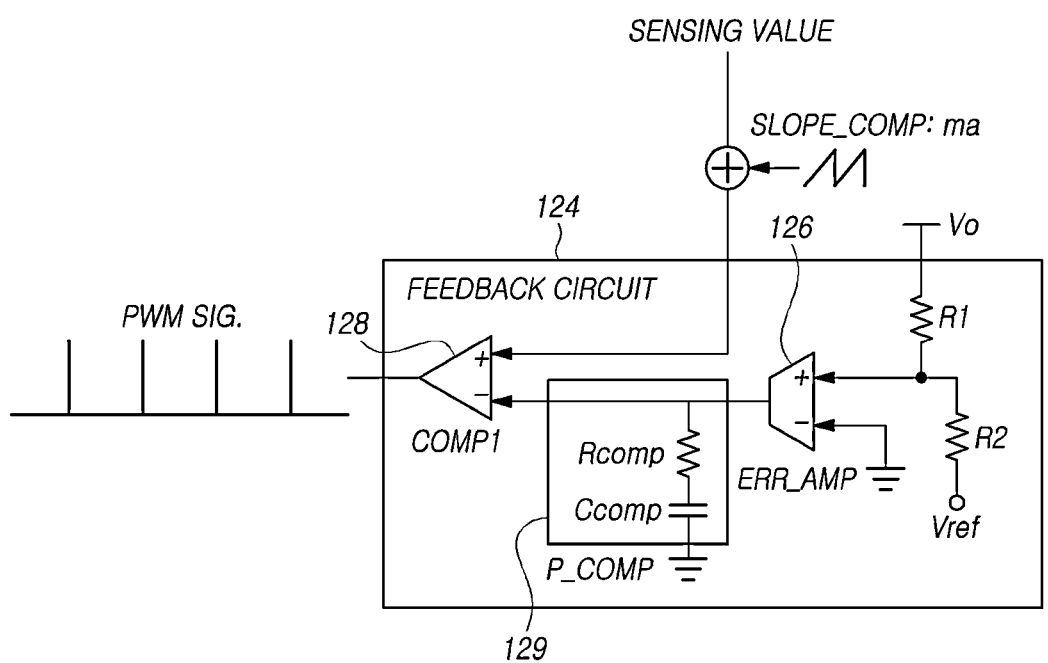
FIG. 22 is a diagram showing a configuration of the feedback circuit of FIG. 21.

FIG. 22 is a diagram showing the feedback circuit of FIG. 21.

Referring to FIG. 22, the sensing circuit 110 may sense the current flowing from the input node Ni and transmit a sensing value SENSING VALUE corresponding to the current flowing from the input node Ni to the feedback circuit 124.

In addition, referring to FIG. 22, the feedback circuit 124 may include an error amplifier 126 that receives a reference voltage Vref and the output voltage Vo, and a first comparator that generates the pulse width modulation signal PWM SIG. based on the output of the error amplifier 126 and a sensing value.

When the feedback circuit 124 operates in the current mode, a sensing value indicating a current value flowing through the inductor L from the input node Ni as well as the output voltage Vo are fed back.

The error amplifier 126 may compare the output voltage Vo with the reference voltage Vref. In this case, the output voltage Vo and the reference voltage Vref may be divided by a resistor R1 and a resistor R2. Voltages obtained by dividing the output voltage Vo and the reference voltage Vref may be input to the non-inverting input terminal of the error amplifier 126. In this case, a ground voltage may be input to the inverting input terminal.

The feedback circuit 124 may compensate for the phase of the value obtained by amplifying an error component through a phase compensator 129. For example, the phase compensator 129 may include a compensation resistor Rcomp and a compensator capacitor Ccomp.

The feedback circuit 124 may compare the output value of the error amplifier 126 whose phase has been compensated by the phase compensator 129 with a sensing value provided from the sensing circuit to generate the pulse width modulation signal PWM SIG.

Meanwhile, in order to prevent subharmonic oscillation that may occur when the duration of the first time period PERIOD1 is greater than ½ of the switching period, a slope compensation value SLOPE_COMP with a slope ma may be added to the sensing value through a slope compensation circuit (not shown).

The feedback circuit 124 may operate in the current mode in which it feeds back the sensing value representing the current IL flowing from the input node Ni to the inductor L and the output voltage Vo to generate the pulse width modulation signal PWM SIG.

Accordingly, it is possible to relatively simply compensate a phase and provide the feedback circuit 124 with high stability of a feedback loop. In addition, it is possible to provide the buck-boost DC/DC converter 100 that performs switching at a fixed frequency.

Figure 23:
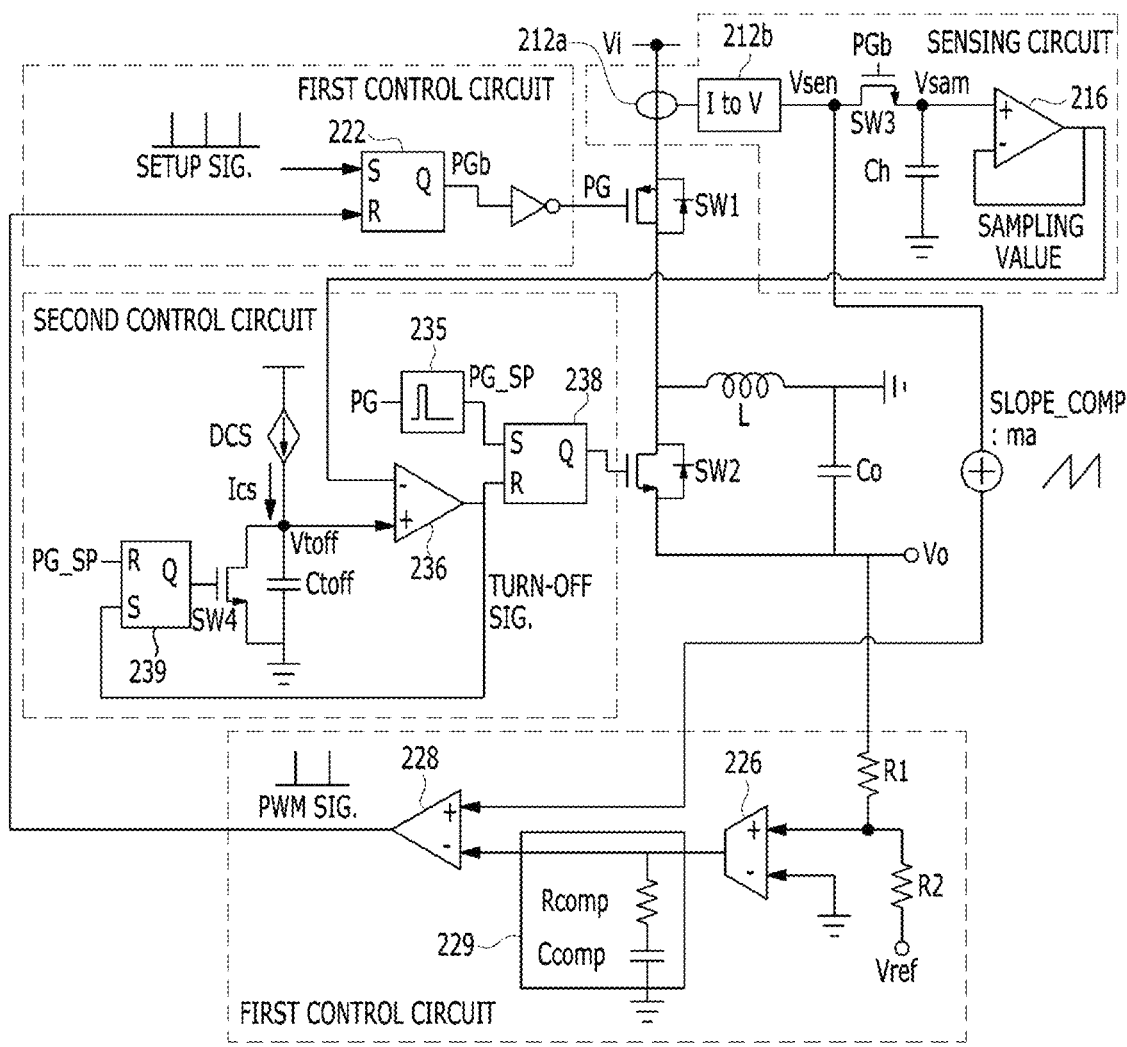
FIG. 23 is a diagram showing another example of the buck-boost DC/DC converter of FIG. 1.

FIG. 23 is a circuit diagram showing another example of the buck-boost DC/DC converter of FIG. 1.

Referring to FIG. 23, the buck-boost DC/DC converter 100 may include a first switch SW1 having one side connected to an input node Ni through which an input voltage Vi is provided, a second switch SW2 disposed between the other side of the first switch SW1 and an output node No through which an output voltage Vo is provided, an inductor L having one side connected to a first node N1 between the first switch SW1 and the second switch SW2 and the other side connected to a second node N2 at which a ground voltage is formed, and an output capacitor Co having one side connected to the output node No and the other side connected to the second node N2.

In addition, the buck-boost DC/DC converter 100 may include a sensing circuit including a current sensor 212a that senses a current flowing from the input node Ni, a current-voltage converter 212b that generates a sensing voltage Vsen, a hold capacitor Ch for holding a sampling voltage Vsam which is a sampling value SAMPLING VALUE, a third switch SW3 that is turned on to sample the sensing voltage Vsen and turned off to hold the sampling voltage Vsam, and a buffer 216 for maintaining the sampling voltage Vsam.

In addition, the buck-boost DC/DC converter 100 may include a first control circuit first CONTROL CIRCUIT including an error amplifier 226 that receives a reference voltage Vref and the output voltage Vo, a first comparator 228 that generates a pulse width modulation signal PWM SIG. based on the output of the error amplifier 226 and the sensing voltage Vsen, and a first latch 222 that receives a setup signal SETUP SIG. and a pulse width modulation signal PWM SIG. and generates a first switching signal first SWITCHING SIG.

Further, the buck-boost DC/DC converter 100 may include a second control circuit second CONTROL CIRCUIT including a dependent current source DCS, a turn-off capacitor Ctoff for charging with a current supplied by the dependent current source DCS, a second comparator 236 that compares a sampling value SAMPLING VALUE with a voltage Vtoff generated in the turn-off capacitor Ctoff and generates a turn-off signal TURN-OFF SIG., a fourth switch SW4 that is disposed in parallel to the turn-off capacitor Ctoff, discharges the turn-off capacitor Ctoff when turned on, and charges the turn-off capacitor Ctoff when turned off, and a second latch 238 that receives a signal corresponding to turn-off of the first switch SW1 and the turn-off signal TURN-OFF SIG. and generates a second switching signal second SWITCHING SIG.

The second control circuit may further include a short pulse generating circuit 235 for assisting the operation of the second latch 238, and a third latch 239 for switching the fourth switch SW4.

In this case, the output voltage Vo may be used to form a current value Ics of the dependent current source DCS. Further, the output voltage Vo may be provided as a non-inverting input of the error amplifier 226 along with the reference voltage Vref. The phase of an error component amplified by the error amplifier 226 may be compensated by a phase compensator 229 including a compensation resistor Rcomp and a compensator capacitor Ccomp.

The sensing voltage Vsen may be used as a non-inverting input of the first comparator 228 after slope compensation has been performed, and the error component whose phase has been compensated by the phase compensator 229 may be used as an inverting input of the first comparator 228. The first comparator 228 may generate the pulse width modulation signal PWM SIG. based on the aforementioned inputs.

Meanwhile, the sampling voltage Vsam that is a sampling value SAMPLING VALUE may be provided as an inverting input of the second comparator 236.

The first to fourth switches SW1, SW2, SW3, and SW4 may be thin film transistors. Specifically, the first switch SW1 may be a P-type thin film transistor. In addition, the second to fourth switches SW2, SW3, and SW4 may be N-type thin film transistors. Conversely, the first switch SW1 may be an N-type thin film transistor, and the second to fourth switches SW2, SW3, and SW4 may be P-type thin film transistors. Hereinafter, it is assumed that the first switch SW1 is a P-type thin film transistor.

The first switch is switched such that it is turned on during the first time period PERIOD1 by the first latch 222 that receives the setup signal SETUP SIG. and the pulse width modulation signal PWM SIG., and turned off during the remaining time period. An inversion value PGb of a gate voltage PG of the first switch SW1 may be input to the gate of the third switch SW3. Since the first switch SW1 is a P-type and the third switch is an N-type, the first switch SW1 and the third switch SW3 are turned on when the first time period PERIOD1 starts and the first switch and the second switch are turned off when the first time period PERIOD1 ends.

Meanwhile, the gate voltage PG of the first switch SW1 may be input to the short pulse generating circuit 235. The short pulse generating circuit 235 may output, to the second latch 238, a second short pulse PG_SP having a short width recognizable by the second latch 238 at a rising edge of the gate voltage of the first switch SW1. The second latch 238 may receive the short pulse PG_SP, which is a signal corresponding to turn-off of the first switch SW1, and the turn-off signal TURN-OFF SIG. generated by the second comparator 236 through the setup terminal S and the reset terminal R thereof, respectively, and switch the second switch SW2.

The third latch 239 may receive the short pulse PG_SP, which is the signal corresponding to turn-off of the first switch SW1, and the turn-off signal TURN-OFF SIG. generated by the second comparator 236 through the reset terminal R and the setup terminal S thereof, respectively, and switch the fourth switch SW4. Accordingly, the second switch SW2 may be turned on and the fourth switch SW4 may be turned off when the first time period PERIOD1 ends and the second time period PERIOD2 starts, and the second switch SW2 may be turned off and the fourth switch SW4 may be turned on when the second time period PERIOD2 ends.

Meanwhile, when the second switch SW2 is implemented as a thin film transistor, relatively high efficiency can be achieved according to a lower resistance than a diode used in an asynchronous buck-boost DC/DC converter 100.

According to the above-described embodiments, it is possible to provide a buck-boost DC/DC converter capable of operating in the DCM mode without using a zero current detection circuit.

As described above, the buck-boost DC/DC converter according to the present embodiment can operate in the DCM mode without using a zero current detection circuit.

What is claimed is:

1. A buck-boost DC/DC converter comprising:
a first switch connected to an input node;
a second switch disposed between one side of the first switch and an output node;
an inductor having one side connected to a first node between the first switch and the second switch and the other side connected to a second node at which a ground voltage is formed;
an output capacitor having one side connected to the output node and the other side connected to the second node;
a first control circuit configured to turn on the first switch during a first time period of a switching period;
a sensing circuit configured to sense a current flowing from the input node and to generate a sampling value for estimating a duration of a second time period of the switching period; and
a second control circuit configured to receive the sampling value from the sensing circuit and to turn on the second switch during the second time period estimated based on the sampling value,
wherein the sensing circuit includes a current sensing circuit configured to generate a sensing voltage by sensing the current flowing from the input node and a sampling holder configured to sample the sensing voltage and provides the sensing voltage to the second control circuit as the sampling value.

2. The buck-boost DC/DC converter of claim 1, wherein the sampling holder includes a hold capacitor for holding a sampling voltage, a third switch turned on to sample the sensing voltage and turned off to hold the sampling voltage, and a buffer for maintaining the sampling voltage.

3. The buck-boost DC/DC converter of claim 2, wherein the third switch is turned on at the start of the first time period to apply the sensing voltage to the hold capacitor such that the sensing voltage is sampled and is turned off at the end of the first time period to hold a peak value of the sampling voltage,
wherein the peak value of the sampling voltage is transferred as a sampling value of the second control circuit.

4. The buck-boost DC/DC converter to claim 1, wherein the second control circuit includes a calculating circuit configured to calculate the duration of the second time period from the sampling value to generate a turn-off signal and a synchronous switching circuit configured to generate a second switching signal corresponding to the turn-off signal and to switch the second switch.

5. The buck-boost DC/DC converter of claim 4, wherein the calculating circuit includes a dependent current source, a turn-off capacitor configured to be charged with a current provided by the dependent current source, and a second comparator configured to compare the sampling value with a voltage formed in the turn-off capacitor and to generate the turn-off signal.

6. The buck-boost DC/DC converter of claim 5, wherein the calculating circuit includes a fourth switch disposed in parallel to the turn-off capacitor and configured to discharge the turn-off capacitor when turned on and to charge the turn-off capacitor when turned off.

7. The buck-boost DC/DC converter of claim 6, wherein a current value of the dependent current source is determined by the output voltage.

8. The buck-boost DC/DC converter of claim 7, wherein the duration of the second time period is determined by [Formula 4], $$T2 = (\text{SAMPLING VALUE} \times Ctoff \times Rcs)/(\alpha \times Vo) \quad \text{[Formula 4]}$$

wherein T2 is the duration of the second time period, SAMPLING VALUE is the sampling value, Ctoff is a capacity of the turn-off capacitor, Rcs and $\alpha$ are set values of the dependent current source, and Vo is the output voltage.

9. The buck-boost DC/DC converter of claim 8, wherein the fourth switch is turned off at the start of the second time period to charge the turn-off capacitor and is turned on at the end of the second time period to discharge the turn-off capacitor.

10. The buck-boost DC/DC converter of claim 4, wherein the synchronous switching circuit includes a second latch and generates the second switching signal by inputting a signal corresponding to turn-off of the first switch and the turn-off signal to the second latch.

11. The buck-boost DC/DC converter of claim 1, wherein the first control circuit generates a setup signal for determining the switching period and a pulse width modulation signal for determining the first time period of the switching period and transmits a first switching signal to the first switch according to alternation of the setup signal and the pulse width modulation signal.

12. The buck-boost DC/DC converter of claim 11, wherein the first control circuit includes a first latch and generates the first switching signal by inputting the setup signal and the pulse width modulation signal to the first latch.

13. The buck-boost DC/DC converter of claim 11, wherein the first control circuit includes a feedback circuit configured to generate the pulse width modulation signal.

14. The buck-boost DC/DC converter of claim 13, wherein
the sensing circuit senses the current flowing from the input node and transmits a sensing value corresponding to the current to the feedback circuit, and
the feedback circuit includes an error amplifier configured to receive a reference voltage and an output voltage and a first comparator configured to generate the pulse width modulation signal based on an output of the error amplifier and the sensing value.

15. A buck-boost DC/DC converter comprising:
a first control circuit configured to build up a current, input through an input node, in an inductor during a first time period of a switching period;
a sensing circuit configured to sense a current input through the input node to generate a sampling value for estimating a duration of a second time period; and
a second control circuit configured to receive the sampling value from the sensing circuit and to output the current built up in the inductor through an output side during the second time period estimated based on the sampling value,
wherein the duration of the second time period is proportional to the sampling value and inversely proportional to an absolute value of the output voltage.

16. The buck-boost DC/DC converter of claim 15, wherein the sampling value corresponds to a peak value of the current input in the switching period.

17. The buck-boost DC/DC converter of claim 15, wherein the sampling value corresponds to a level of the current input at the end of the first time period.

* * * * *